US012562617B2

(12) United States Patent (10) Patent No.: US 12,562,617 B2
Tanaka (45) Date of Patent: Feb. 24, 2026

(54) TERMINAL BLOCK

(71) Applicant: TOYOTA JIDOSHA KABUSHIKI KAISHA, Aichi (JP)

(72) Inventor: Masahiro Tanaka, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 140 days.

(21) Appl. No.: 18/515,280

(22) Filed: Nov. 21, 2023

(65) Prior Publication Data

US 2024/0178720 A1 May 30, 2024

(30) Foreign Application Priority Data

Nov. 29, 2022 (JP) ................................. 2022-190105

(51) Int. Cl.
 *H02K 5/22* (2006.01)
 *H02K 11/33* (2016.01)
(52) U.S. Cl.
 CPC ............. *H02K 5/225* (2013.01); *H02K 11/33* (2016.01)
(58) Field of Classification Search
 CPC ............................... H02K 5/225; H02K 11/33
 See application file for complete search history.

(56) References Cited

U.S. PATENT DOCUMENTS 10,763,722 B2 * 9/2020 Hochstetler .......... H01R 9/2416
2018/0252223 A1 * 9/2018 Yamasaki ................ H02K 5/16

FOREIGN PATENT DOCUMENTS

JP 2000-223212 A 8/2000
JP 2008-252985 A 10/2008
JP 2013-110817 A 6/2013
JP 2021-157923 A 10/2021
JP 2022161647 A 10/2022

* cited by examiner

*Primary Examiner* — Terrance L Kenerly
(74) *Attorney, Agent, or Firm* — HAUPTMAN HAM, LLP

(57) ABSTRACT

A terminal block may electrically connect a motor and an inverter. The terminal block may include a base member configured to be attached to a motor case that houses the motor and a plurality of single terminal units, each of which is independent of each other and is assembled to the base member. Each of the plurality of single terminal units may include a terminal member constituted of a conductive material and a terminal holder fixed to the terminal member and engaged with the base member.

6 Claims, 5 Drawing Sheets

UP

LEFT     FRONT

REAR     RIGHT

DOWN

UP

LEFT   FRONT

REAR   RIGHT

DOWN

FRONT

LEFT ←→ RIGHT

REAR

FRONT

LEFT ←→ RIGHT

REAR

TERMINAL BLOCK

REFERENCE TO RELATED APPLICATIONS

This application claims priority from Japanese Patent Application No. 2022-190105 filed on Nov. 29, 2022. The entire content of the priority application is incorporated herein by reference.

TECHNICAL FIELD

The art disclosed herein relates to a terminal block.

BACKGROUND ART

A terminal block is disclosed in Japanese Patent Application Publication No. 2021-157923. This terminal block has a base member and a plurality of single terminal units. The base member and the plurality of single terminal units are integrated by insert molding.

DESCRIPTION

In conventional configurations, an entirety of a terminal block needs to be redesigned even when a design change is required for only one of the base member or the plurality of single terminal units. This may increase time and cost required for the design change in the terminal block. This specification provides a technology that allows to reduce time and cost required for a design change in a terminal block.

A terminal block disclosed herein may electrically connect a motor and an inverter. The terminal block may comprise a base member configured to be attached to a motor case that houses the motor and a plurality of single terminal units, each of which is independent of each other and is assembled to the base member. Each of the plurality of single terminal units may comprise a terminal member constituted of a conductive material and a terminal holder fixed to the terminal member and engaged with the base member.

According to the above configuration, the base member and the plurality of single terminal units are separate. The terminal block is configured by assembling each of the plurality of single terminal units to the base member. Therefore, if a design change is required for one of the base member and the plurality of single terminal units, it suffices to redesign only one of the base member and the plurality of single terminal units. For those that do not require design changes, the existing ones can be used. Therefore, the time and cost required to redesign a terminal block can be reduced.

Figure 1:
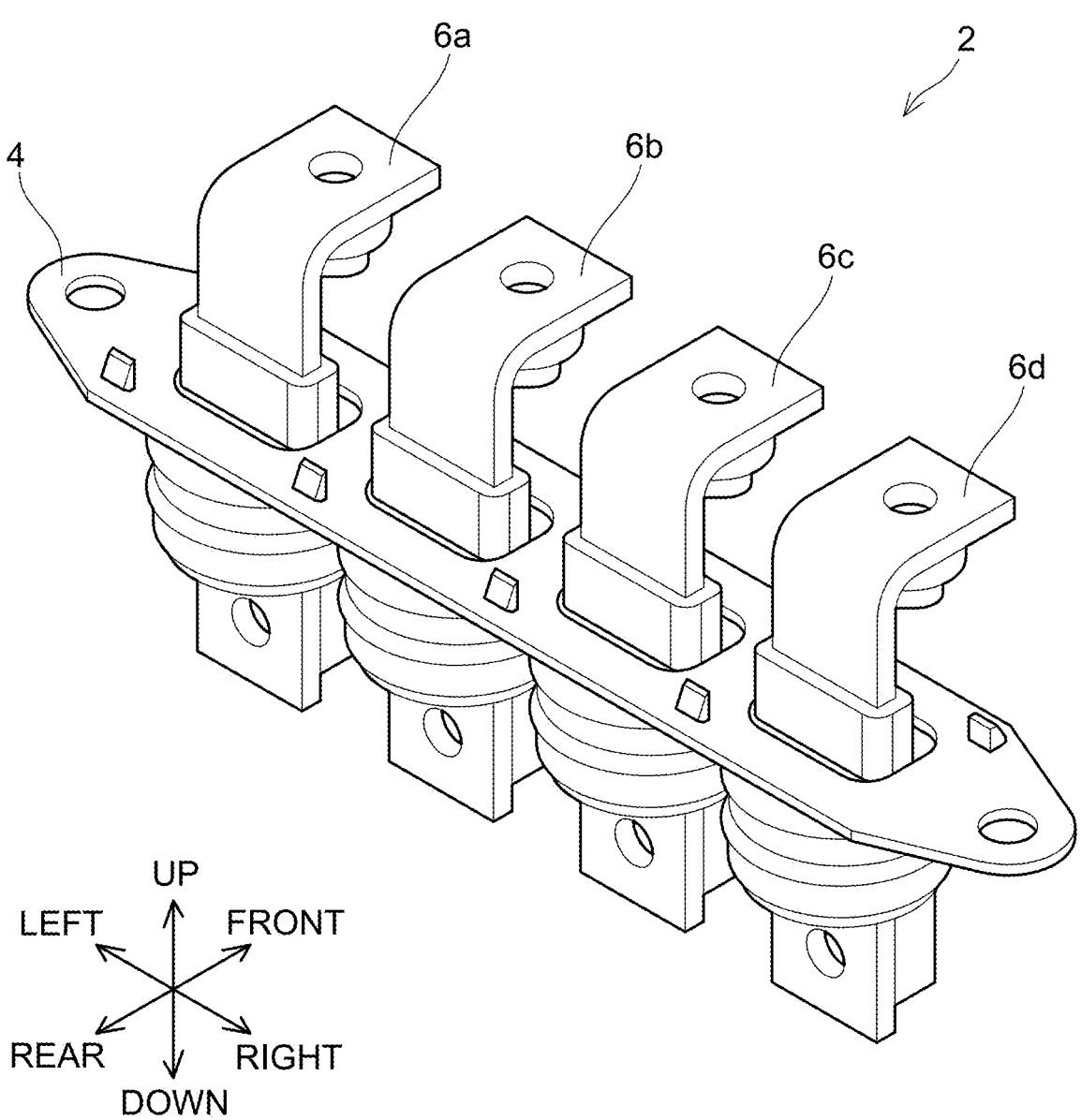
FIG. 1 shows an overall perspective view of a terminal block 2 according to a first embodiment.

In one or more embodiments, each of the terminal holders may comprise at least one engagement portion protruding toward the base member along a direction in which the terminal member extends. The base member may comprise a plurality of terminal holes and a plurality of engagement holes. Each of the terminal members of the plurality of single terminal units may be disposed in a corresponding one of the plurality of terminal holes. Each of the engagement portions of the plurality of single terminal units may be engaged with a corresponding one of the plurality of engagement holes.

According to the above configuration, a direction of inserting the terminal members into the respective terminal holes and a direction of inserting the engagement portions into the respective engagement holes are substantially coincident. Due to this, the engagement portions can be inserted into the engagement holes along with inserting the terminal members into the terminal holes. Therefore, time and workload required for assembling the single terminal units to the base member can be reduced.

In one or more embodiments, in each of the plurality of engagement holes, a play may be disposed between the engagement hole and the corresponding engagement portion. Each of the plurality of single terminal units may be supported by the base member in a displaceable manner.

Generally, a motor case includes fitting holes that respectively correspond to each of a plurality of single terminal units. In the conventional configuration where the base member and plurality of single terminal units are integrated, the single terminal units are fixed to the base member in a non-displaceable manner. In this case, it can be difficult to insert the single terminal units into the fitting holes. According to the above configuration, the single terminal units are supported by the base member in a displaceable manner due to the plays secured. Due to this, when the single terminal units are being inserted into the fitting holes, the single terminal units gradually fit into the fitting holes due to the displacement of the single terminal units relative to the base member. This facilitates insertion of the single terminal units into the fitting holes.

In one or more embodiments, in the base member, the plurality of terminal holes may be aligned along a first straight line and each of the plurality of engagement holes may be offset from the first straight line.

If the engagement holes are arranged in positions that overlap the first straight line, the engagement holes will be arranged along the first straight line together with the plurality of terminal holes. In this case, it is necessary to secure extra space for the engagement holes in the direction in which the first straight line extends. This may cause the base member to become larger in the direction in which the first straight line extends. According to the above configuration, each of the plurality of engagement holes is offset from the first straight line (i.e., the engagement holes are disposed at positions offset from the first straight line). Due to this, it is not necessary to secure a space for the engagement holes in the direction in which the first straight line extends. Therefore, the base member can be downsized in the direction in which the first straight line extends.

In one or more embodiments, the plurality of engagement holes may include a plurality of first engagement holes offset to one side of the first straight line and a plurality of second engagement holes offset to another side of the first straight line. The at least one engagement portion of each of the terminal holders may include a first engagement portion engaged with one of the plurality of first engagement holes and a second engagement portion engaged with one of the plurality of second engagement holes. In each of the plurality of single terminal units, the first engagement portion may be offset from the terminal member to the one side in a direction parallel to the first straight line and the second engagement portion may be offset from the terminal member to the other side in the direction parallel to the first straight line.

If the terminal holes, the first engagement holes, and the second engagement holes are arranged in a direction perpendicular to the first straight line, the base member may become larger with respect to the direction perpendicular to the first straight line. According to the above configuration, it is avoided that the terminal holes, the first engagement holes, and the second engagement holes are arranged in the direction perpendicular to the first straight line. Due to this, the base member can be downsized in the direction perpendicular to the first straight line.

Furthermore, according to the above configuration, one first engagement hole and one second engagement hole are arranged between two adjacent terminal holes. The first engagement hole and the second engagement hole are arranged on opposite sides of the first straight line. Due to this, the first and second engagement holes do not interfere with each other between the two adjacent terminal holes. Therefore, a distance between the two adjacent terminal holes can be relatively small, allowing the base member to be downsized in the direction in which the first straight line extends.

In one or more embodiments, the plurality of single terminal units may include a first single terminal unit configured to electrically connect a U-phase coil of the motor and the inverter, a second single terminal unit configured to electrically connect a V-phase coil of the motor and the inverter, a third single terminal unit configured to electrically connect a W-phase coil of the motor and the inverter, and a fourth single terminal unit configured to electrically connect a neutral point of the motor and the inverter.

The above terminal block can allow to electrically connect each of the U-phase coil, V-phase coil, W-phase coil, and neutral point to the inverter. This makes it possible to provide a terminal block that is compatible with a technology such as motor charging using a neutral point.

First Embodiment; Terminal Block 2

A terminal block 2 in a present embodiment electrically connects a motor (not shown) and an inverter (not shown). The motor and inverter are installed in a vehicle, for example, a hybrid vehicle.

As shown in FIG. 1, the terminal block 2 comprises a plate 4 and a plurality of single terminal units 6a, 6b, 6c, 6d. The plate 4 is constituted of metal and has a shape of a flat plate. In FIG. 1 and subsequent drawings, front-back, left-right, and up-down directions are defined for convenience. The up-down direction corresponds to a direction orthogonal to the plate 4. The left-right direction is orthogonal to the up-down direction and corresponds to a longitudinal direction of the plate 4. The front-back direction is orthogonal to the up-down direction and corresponds to a short direction of the plate 4.

Figure 2:
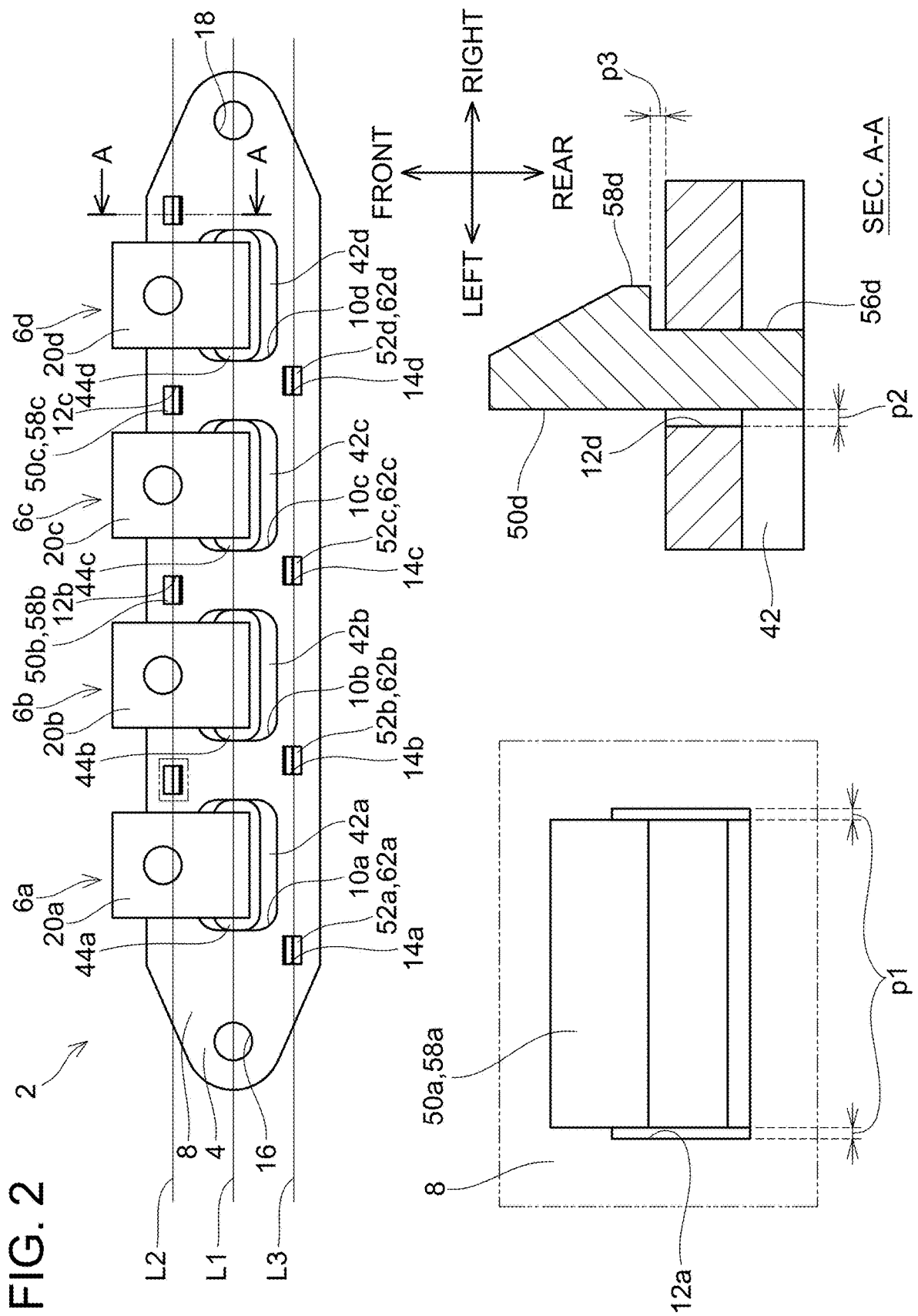
FIG. 2 is a top view of the terminal block 2 according to the first embodiment.

As shown in FIG. 2, the plate 4 has a plate body 8, a plurality of terminal holes 10a, 10b, 10c, 10d, a plurality of first engagement holes 12a, 12b, 12c, 12d, a plurality of second engagement holes 14a, 14b, 14c, 14d, a left fastening hole 16, and a right fastening hole 18. The plate 4 can be secured to a motor case (not shown) by screws at the left fastening hole 16 and the right fastening hole 18.

The plurality of terminal holes 10a, 10b, 10c, 10d each have a substantially rectangular shape. The plurality of terminal holes 10a, 10b, 10c, 10d are aligned along a straight line L1 at predetermined intervals. The straight line L1 extends parallel to the left-right direction and passes through respective centers of the plurality of terminal holes 10a, 10b, 10c, 10d.

Each of the plurality of first engagement holes 12a, 12b, 12c, 12d is aligned along a straight line L2 located at a position offset forward from the straight line L1. Each of the plurality of second engagement holes 14a, 14b, 14c, 14d is aligned along a straight line L3 located at a position offset backward from the straight line L1.

Each of the plurality of single terminal units 6a, 6b, 6c, 6d is assembled to the plate 4. Each of the plurality of single terminal units 6a, 6b, 6c, 6d is for electrical connection between a so-called three-phase motor and the inverter. For example, three single terminal units 6a, 6b, 6c of the single terminal units 6a, 6b, 6c, 6d are for electrically connecting each of the U-phase coil, V-phase coil, and W-phase coil of the three-phase motor to the inverter. The remaining one single terminal unit 6d of the plurality of single terminal units 6a, 6b, 6c, and 6d is for electrically connecting a neutral point, where each coil of the three-phase motor is connected, with the inverter. Each of the plurality of single terminal units 6a, 6b, 6c, 6d has a common shape with each other. For this reason, each of the plurality of single terminal units 6a, 6b, 6c, 6d may hereinafter be referred to collectively as "single terminal units 6" or "plurality of single terminal units 6".

Figure 3:
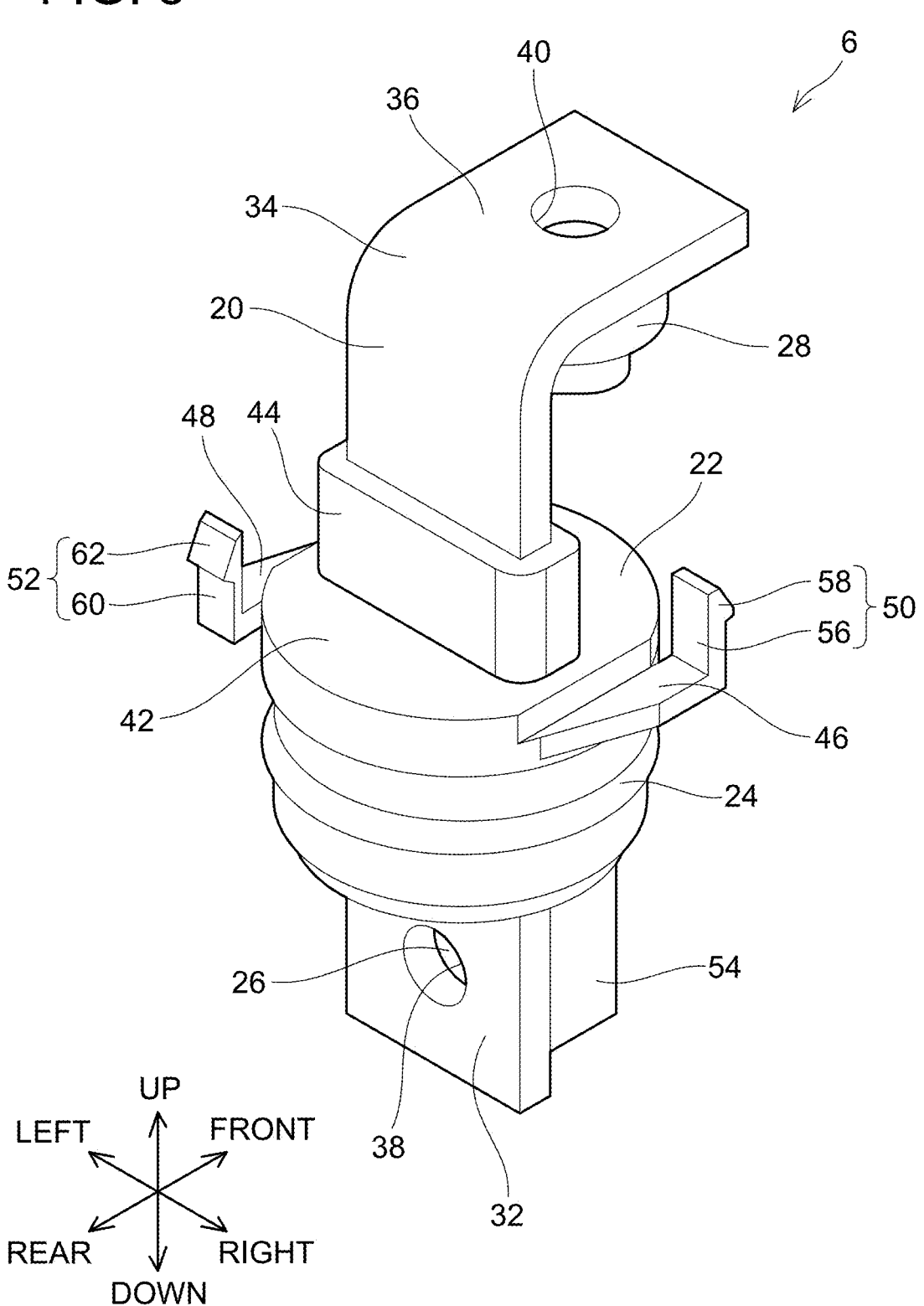
FIG. 3 shows a single terminal unit 6 before being assembled to a plate 4 in the terminal block 2 according to the first embodiment.

As shown in FIG. 3, each single terminal unit 6 has a terminal member 20, a terminal holder 22, a seal member 24, a first nut 26, and a second nut 28. The terminal member 20 is constituted of a conductive metal material. The terminal member 20 has a plate shape. The terminal member 20 has a first flat portion 32, a bend portion 34, and a second flat portion 36. The first flat portion 32 extends orthogonally to the front-back direction and extends along the up-down direction. The bend portion 34 bends forward from an upper end of the first flat portion 32. The second flat portion 36 extends forward from a front end of the bend portion 34. The second flat portion 36 extends orthogonally to the up-down direction. A first through hole 38 is arranged near a lower end of the first flat portion 32. A second through hole 40 is arranged at a center part of the second flat portion 36.

The terminal holder 22 is integrated with the terminal member 20 and the first nut 26, for example, by insert molding. The terminal holder 22 is constituted of a resin material, for example. The terminal holder 22 has a trunk 42, a neck 44, a first arm 46, a second arm 48, a first engagement portion 50, a second engagement portion 52, and a nut holding portion 54. The trunk 42, neck 44, first arm 46, second arm 48, first engagement portion 50, second engagement portion 52, and nut holding portion 54 are seamlessly formed as one piece.

The trunk 42 has a substantially cylindrical shape extending along the up-down direction. The trunk 42 is configured to be fitted into a fitting hole (not shown) arranged in the motor case. The seal member 24 is disposed around the trunk 42. The seal member 24 in the present embodiment is a so-called O-ring. When the trunk 42 is fitted into the fitting hole, the seal member 24 can seal between the trunk 42 and the fitting hole. The neck 44 extends upward from an upper surface of the trunk 42. The trunk 42 and neck 44 are arranged to cover a portion of the first flat portion 32.

Each of the first arm 46 and the second arm 48 extends from an outer peripheral surface of the trunk 42 in a direction tangential to the outer peripheral surface. The first engagement portion 50 has a first protrusion 56 protruding upward from a tip of the first arm 46 and a first pawl 58 disposed at an upper end of the first protrusion 56. The second engagement portion 52 has a second protrusion 60 protruding upward from a tip of the second arm 48 and a second pawl 62 disposed at an upper end of the second protrusion 60.

The nut holding portion 54 holds the first nut 26 with the first nut 26 aligned with the first through hole 38. This allows a bolt (not shown) corresponding to the first nut 26 to pass through the first through hole 38 and then be screwed into the first nut 26. The bolt and the first nut 26 can fasten a terminal on the motor side (not shown) to the terminal member 20.

The second nut 28 is fixed to the second flat portion 36 with the second nut 28 aligned with the second through hole 40, for example by welding. This allows a bolt (not shown) corresponding to the second nut 28 to pass through the second through hole 40 and then be screwed into the second nut 28. The bolt and second nut 28 can fasten a terminal on the inverter side (not shown) to the terminal member 20.

As shown in FIG. 2, each pair of the terminal member 20 and the neck 44 are inserted into a corresponding one of the plurality of terminal holes 10a, 10b, 10c, 10d of the plate 4. Each of the first engagement portions 50 engages with a corresponding one of the plurality of first engagement holes 12a, 12b, 12c, 12d of the plate 4. Specifically, the first pawl 58 of each first engagement portion 50 snap-fits into the plate body 8, passing through the corresponding first engagement hole 12. Each of the second engagement portions 52 engages with a corresponding one of the plurality of second engagement holes 14a, 14b, 14c, 14d of the plate 4. Specifically, the second pawl 62 of each second engagement portion 52 snap-fits into the plate body 8, passing through the corresponding second engagement hole 14. As a result, the single terminal units 6 are supported by the plate 4.

With the single terminal units 6 supported by the plate 4, each of the first engagement portions 50 is offset to the right relative to the corresponding terminal member 20. Each of the second engagement portions 52 is offset to the left relative to the corresponding terminal member 20. In a top view, the first engagement portions 50, the terminal members 20, and the second engagement portions 52 are arranged in directions inclined from the front-back and left-right directions.

Between each pair of the first engagement hole 12 and the first engagement portion 50, there are a play p1 in the left-right direction, a play p2 in the front-back direction, and a play p3 in the up-down direction. Although not shown in the figures, plays corresponding to the plays p1, p2, and p3 are also arranged between each pair of the second engagement hole 14 and the second engagement portion 52. These plays allow each of the single terminal units 6 to be displaced in the front-back, left-right, and up-down directions with respect to the plate 4. In the state shown in FIG. 2, the upper surfaces of the trunks 42 and a lower surface of the plate body 8 are in contact with each other.

As shown in FIG. 2, the placement and arrangement of the plurality of single terminal units 6 is defined by the placement and arrangement of the plurality of terminal holes 10, the plurality of first engagement holes 12, and the plurality of second engagement holes 14. In other words, the placement and arrangement of the plurality of single terminal units 6 is defined by the plate 4.

Second Embodiment; Terminal Block 202

In the following description, an explanation of points common between a terminal block 202 and the terminal block 2 will be omitted, and only differences between the terminal block 202 and terminal block 2 will be described. The terminal block 202 differs from the terminal block 2 in that the terminal block 202 does not electrically connect a neutral point of a three-phase motor to an inverter.

Figure 4:
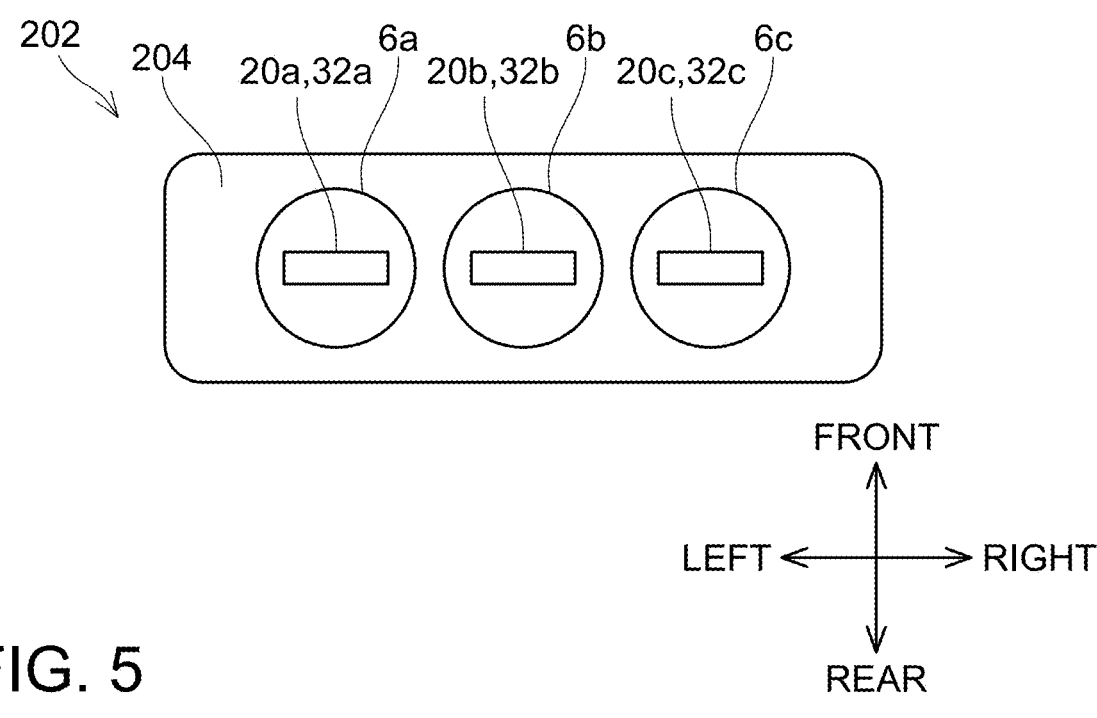
FIG. 4 schematically shows a top view of a terminal block 202 according to a second embodiment.

As shown in FIG. 4, the terminal block 202 comprises a plate 204 instead of the plate 4. The terminal block 202 also comprises single terminal units 6a, 6b, 6c and does not comprise a single terminal unit 6d. The plate 204 defines the placement and arrangement of the single terminal units 6a, 6b, 6c. The single terminal units 6a, 6b, 6c are arranged in a substantially straight line along a longitudinal direction of the plate 204. The single terminal units 6a, 6b, 6c are arranged so that first flat portions 32a, 32b, 32c are parallel to the longitudinal direction of the plate 204.

Third Embodiment; Terminal Block 302

In the following description, an explanation of points common between a terminal block 302 and the terminal block 202 will be omitted, and only differences between the terminal block 302 and the terminal block 202 will be described.

Figure 5:
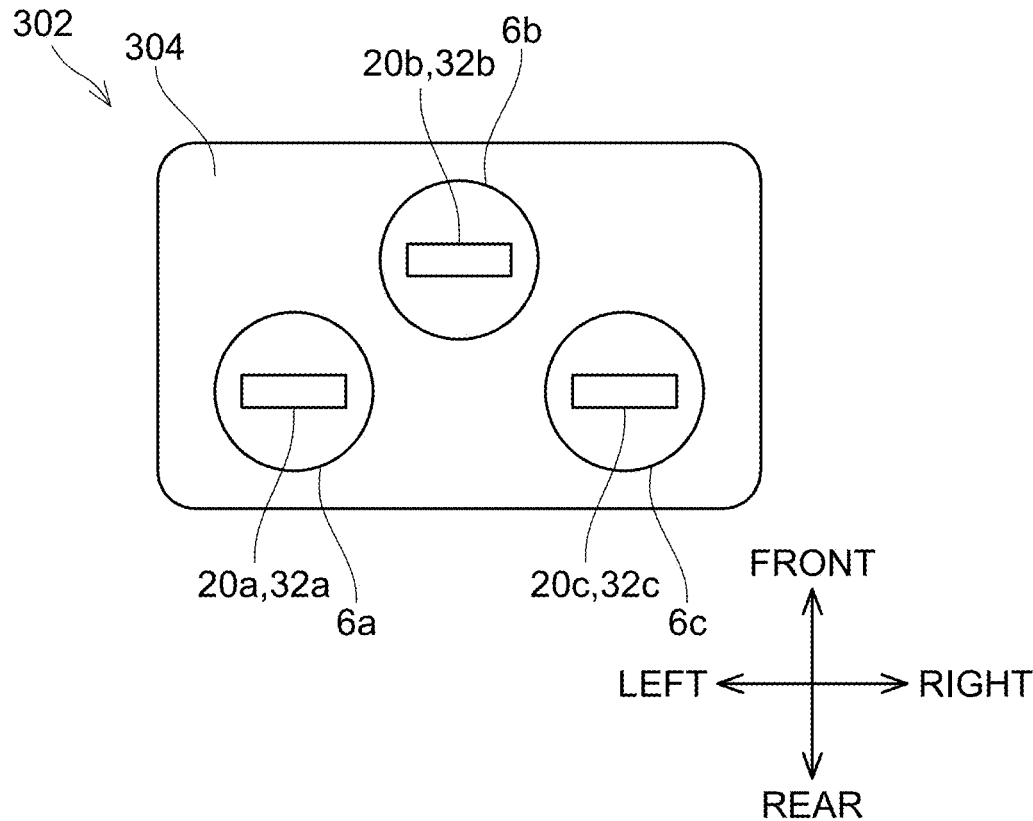
FIG. 5 schematically shows a top view of a terminal block 302 according to a third embodiment.

As shown in FIG. 5, the terminal block 302 comprises a plate 304 instead of the plate 204. The plate 304 defines the placement and arrangement of single terminal units 6a, 6b, 6c. In a top view, the single terminal units 6a, 6b, 6c are arranged in a substantially V-shape. The single terminal units 6a, 6b, 6c are arranged so that first flat plate portions 32a, 32b, 32c are parallel to a longitudinal direction of the plate 304.

Fourth Embodiment; Terminal Block 402

In the following description, an explanation of points common between a terminal block 402 and the terminal block 202 will be omitted, and only differences between the terminal block 402 and the terminal block 202 will be described.

Figure 6:
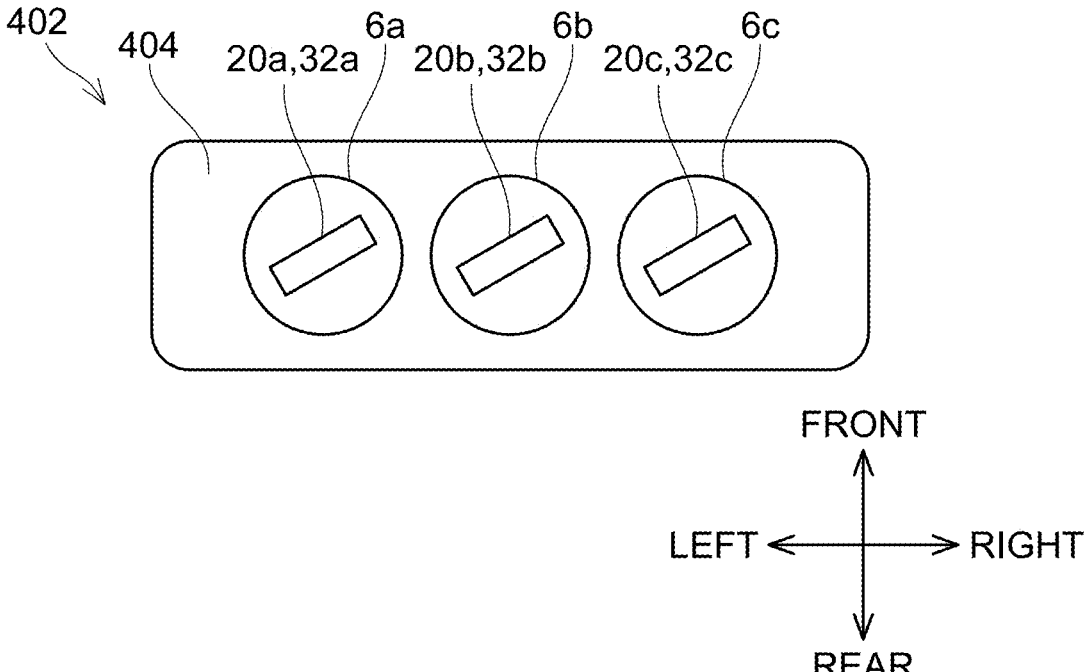
FIG. 6 schematically shows a top view of a terminal block 402 according to a fourth embodiment.

As shown in FIG. 6, a terminal block 402 comprises a plate 404 instead of the plate 204. The plate 404 defines the placement and arrangement of single terminal units 6a, 6b, 6c. The single terminal units 6a, 6b, 6c are arranged in a substantially straight line along a longitudinal direction of the plate 404. The single terminal units 6a, 6b, 6c are arranged so that first flat plate portions 32a, 32b, 32c are parallel to a direction inclined at a predetermined angle from the longitudinal direction of the plate 404.

(Variants)

The number of the plurality of single terminal units 6 to be assembled to the plate 4 may be changed as needed. The number of the plurality of single terminal units 6 to be assembled to the plate 4 may be two, for example.

A shape of the plurality of single terminal units 6 (e.g., length of the terminal members 20) may be modified accordingly.

Placement and arrangement of the plurality of terminal holes 10, the plurality of first engagement holes 12, and the plurality of second engagement holes 14 may be changed as appropriate. Accordingly, placement and arrangement of the plurality of single terminal units 6 may be changed as appropriate.

Engagement means for assembling the plurality of single terminal units 6 to the plate 4 is not limited to snap-fit. For example, those engagement means may be screwing male threads defined in the single terminal units 6 into female threads defined in the plate 4.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A terminal block for electrically connecting a motor and an inverter, the terminal block comprising:

a base member configured to be attached to a motor case that houses the motor; and a plurality of single terminal units, each of which is independent of each other and is assembled to the base member, wherein each of the plurality of single terminal units comprises a terminal member constituted of a conductive material and a terminal holder fixed to the terminal member and engaged with the base member, each of the terminal holders comprises at least one engagement portion protruding toward the base member along a direction in which the terminal member extends, the base member comprises a plurality of terminal holes and a plurality of engagement holes, each of the terminal members of the plurality of single terminal units is disposed in a corresponding one of the plurality of terminal holes, each of the engagement portions of the plurality of single terminal units is engaged with a corresponding one of the plurality of engagement holes, in the base member, the plurality of terminal holes is aligned along a first straight line and each of the plurality of engagement holes is offset from the first straight line, the plurality of engagement holes includes a plurality of first engagement holes offset to one side of the first straight line and a plurality of second engagement holes offset to another side of the first straight line, the at least one engagement portion of each of the terminal holders includes a first engagement portion engaged with one of the plurality of first engagement holes and a second engagement portion engaged with one of the plurality of second engagement holes, in each of the plurality of single terminal units, the first engagement portion is offset from the terminal member to the one side in a direction parallel to the first straight line and the second engagement portion is offset from the terminal member to the other side in the direction parallel to the first straight line, the plurality of single terminal units includes a first single terminal unit and a second single terminal unit adjacent to the first single terminal unit, and a position of the first engagement hole into which the first engagement portion of the first single terminal unit is inserted and a position of the second engagement hole into which the second engagement portion of the second single terminal unit is inserted overlap in a direction perpendicular to the first straight line.

2. The terminal block according to claim 1, wherein in each of the plurality of engagement holes, a play is disposed between the engagement hole and the corresponding engagement portion, and each of the plurality of single terminal units is supported by the base member in a displaceable manner.

3. The terminal block according to claim 1, wherein the plurality of single terminal units includes:

the first single terminal unit configured to electrically connect a U-phase coil of the motor and the inverter, the second single terminal unit configured to electrically connect a V-phase coil of the motor and the inverter, a third single terminal unit configured to electrically connect a W-phase coil of the motor and the inverter, and a fourth single terminal unit configured to electrically connect a neutral point of the motor and the inverter.

4. A terminal block for electrically connecting a motor and an inverter, the terminal block comprising:

a base member configured to be attached to a motor case that houses the motor; and a plurality of single terminal units, wherein each of the plurality of single terminal units comprises a terminal member constituted of a conductive material and a terminal holder fixed to the terminal member, each of the terminal holders comprises a first engagement portion and a second engagement portion, each of the first engagement portion and the second engagement portion protruding toward the base member along a direction in which the terminal member extends, the base member comprises:

a plurality of terminal holes aligned along a first straight line;

a plurality of first engagement holes offset to one side of the first straight line; and a plurality of second engagement holes offset to another side of the first straight line, each of the terminal members of the plurality of single terminal units is disposed in a corresponding one of the plurality of terminal holes, each of the first engagement portions of the plurality of single terminal units is engaged with a corresponding one of the plurality of first engagement holes, each of the second engagement portions of the plurality of single terminal units is engaged with a corresponding one of the plurality of second engagement holes, the plurality of single terminal units includes a first single terminal unit and a second single terminal unit adjacent to the first single terminal unit, and a position of the first engagement hole into which the first engagement portion of the first single terminal unit is inserted and a position of the second engagement hole into which the second engagement portion of the second single terminal unit is inserted overlap in a direction perpendicular to the first straight line.

5. The terminal block according to claim 4, wherein in each of the plurality of first engagement holes, a play is disposed between the first engagement hole and the corresponding first engagement portion, in each of the plurality of second engagement holes, a play is disposed between the second engagement hole and the corresponding second engagement portion, and each of the plurality of single terminal units is supported by the base member in a displaceable manner.

6. The terminal block according to claim 4, wherein the plurality of single terminal units includes:

the first single terminal unit configured to electrically connect a U-phase coil of the motor and the inverter, the second single terminal unit configured to electrically connect a V-phase coil of the motor and the inverter, a third single terminal unit configured to electrically connect a W-phase coil of the motor and the inverter, and a fourth single terminal unit configured to electrically connect a neutral point of the motor and the inverter.

\* \* \* \* \*